Patented Apr. 19, 1932

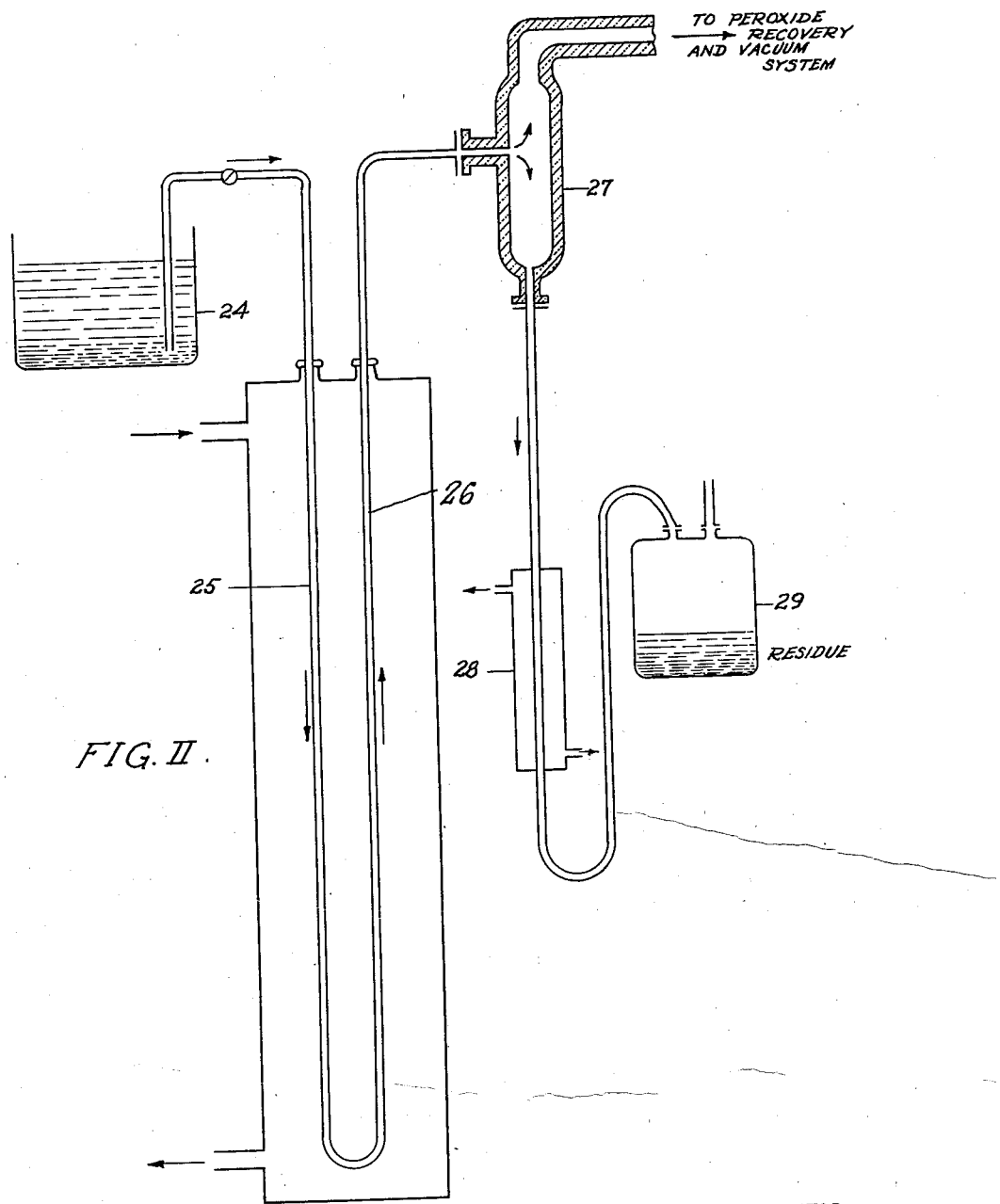

1,854,327

UNITED STATES PATENT OFFICE

GUSTAV BAUM, OF WEISSENSTEIN-ON-THE-DRAU, AUSTRIA, ASSIGNOR TO THE NIAGARA ELECTRO CHEMICAL COMPANY, INC., OF NEW YORK, N. Y., A CORPORATION OF NEW YORK

PROCESS OF MAKING HYDROGEN PEROXIDE

Application filed July 10, 1928, Serial No. 291,619, and in Austria July 11, 1927.

This invention relates to improvements in the concentration of hydrogen peroxide solutions and to the distillation of hydrogen peroxide produced by the hydrolysis of solutions of hydrogen persulfate or of salts of persulfuric acid.

It has heretofore been considered impossible to use apparatus constructed of such material as lead or acid resistant iron or similar metal or alloy for effecting the distillation or concentration of solutions containing active oxygen such as peracids or salts and hydrogen peroxide without very serious or even complete decomposition and loss of active oxygen and serious attack of the metal.

Due to this catalytic effect of metals it has therefore been the practice to use various distilling or concentrating devices of ceramic or silica materials. Processes thus limited to ceramic or silica ware suffer the very serious handicap that the heat transfer is very poor. Also, such material is fragile under conditions of use and the losses and interruptions incidental to breakage are very serious.

After numerous experiments I have made the surprising discovery that metals which have previously been considered entirely unsuitable for the thermal treatment of hydrogen peroxide solutions or of persulfuric acid and persulfate solutions because they were severely attacked by these solutions as well as by the vapors of hydrogen peroxide, and because they caused catalytic decomposition and loss of active oxygen, can nevertheless be used very effectively for the heat transfer portions of the apparatus. It is only necessary to use for these structures such metals as are resistant to the distillation or decomposition residues and to take care that their inner surfaces are covered with the liquid undergoing thermal treatment. It is absolutely necessary that such metals do not make contact with the distillation vapors. Suitable metals are such as lead, acid resistant iron or similar alloys.

My apparatus is accordingly constructed so that the heat transfer portions are made of acid resistant metal and those portions of the apparatus which contain the cold solution to be distilled are made of material such as ceramic ware resistant to attack, and those portions of the apparatus which come in contact with the vapors are prepared of material such as silica or ceramic ware which is not attacked by the vapors or does not cause a catalytic decomposition thereof.

The heated portion of the apparatus the surfaces of which are covered or irrigated by the liquid to be distilled or concentrated are constructed of metals which, although catalytically acting on persulfuric acid or persulfates and hydrogen peroxide, are practically not attacked by the residual liquor (concentrated sulfuric acid or sulfate solution) or by the solvent. The further condition is to be complied with, that the metallic surfaces be permanently and completely covered by a continuous film of liquid keeping the hydrogen peroxide vapors out of contact with the metal surfaces. This is effected according to one mode of carrying out my invention by drawing the persulfuric solutions as a continuous stream through distilling tubes in the same direction in which the distillation products leave the tube, so that the generated $H_2O_2$ containing vapors rushing along through the middle of the cylinder of liquid force the residue as a completely covering film against the inner surface of the metallic tube.

For obtaining the best results there is another additional condition, that the distillation takes place in narrow tubes with a long distance of travel to raise both the heat input and the increase of temperature to such an extent, that the hydrogen peroxide generated by the progressive hydrolysis is in the moment of its generation removed by evaporation from the liquid film streaming along the tube wall. Thus by a high rate of flow of the persulfate solution also a diffusion of the hydrogen peroxide vapors into the liquid film forming a protecting cover on the metal walls, is prevented, although said vapors have a long way to travel through the heated zone.

A method of distilling persulfate solutions in heated tubes of metal such as lead has been described. However, in this method it is not possible to maintain a continuous film of solution at all times over the surface of metal. This is because the flow of distillation vapors is counter current to the flow of residual liquor, which not only causes the film to be non-uniform and to often break, especially where fresh solution is introduced as a jet, thus leaving the heated surface in contact with the vapors of hydrogen peroxide, but also produces a refluxing action on the vapors throughout the tube and especially at the point of entry of fresh persulfate solution which inevitably results in contact of hydrogen peroxide solution with metal.

Furthermore, in this prior method the vapors of hydrogen peroxide, after leaving the heating tube, were permitted to contact with metal which caused decomposition of $H_2O_2$ and loss of active oxygen.

On the other hand, I have found that it is absolutely necessary, for high yields, to use materials noncatalytic to the decomposition of hydrogen peroxide, such as ceramic ware, for all portions of the apparatus in which contact with the distillation vapors is unavoidable, and where catalytic metals such as lead are used, to provide a continuous film of residual liquor completely covering such metals at all times. This residual liquor does not act upon lead because it contains substantially no hydrogen peroxide or persulfate.

The prior method referred to above is based on the assumption that it is necessary to distill off the generated hydrogen peroxide faster than the rate of its dissociation and that therefore the rapidity of removal and condensation of hydrogen peroxide vapors after their formation ought to be greater than the rapidity of decomposition. On the contrary, what is absolutely necessary is that the metal surface be protected throughout by a completely covering film of residual liquor, which is free of hydrogen peroxide, that means that the hydrogen peroxide formed by hydrolysis is according to the rate of the hydrolysis so to say in the moment of its generation removed from the said protective film by evaporation. For this reason I employ heating tubes having a small diameter and a correspondingly greater length, if desired coils or the like. The fact that the hydrogen peroxide vapors instantaneously expelled from the protective layer will thus have to travel a rather long way until leaving the heated tube, does not involve difficulties, as the said vapors are nowhere coming into contact with the metallic surfaces and as by the increase of the heating surface at the same time also the possibility is given of increasing the rate of flow of the persulfuric solution to such extent that a diffusion of the escaping hydrogen peroxide vapors into the protective layer of liquid is reliably avoided. The increase of temperature brought about by this arrangement—in proportion to the expulsion of the hydrogen peroxide by evaporation also the temperature of the residual liquor increases—offers the further advantages that no reflux condensation will take place. Moreover this arrangement allows rather thick walled tubes to be employed, which condition is indispensable as the apparatus works with reduced pressure and in addition thereto the walls of the tubes are externally exposed to the pressure of the steam used for the heating. For this reason, the prior proposal, according to which thin walled tubes must be used is not realisable in practice and the yields are unsatisfactory. On the other hand, when the process utilizing metallic heating bodies is carried out by observing all the requirements necessary according to the present invention the result becomes so favorable that nearly the theoretical yield is obtained. The result is consequently even superior to that of the usual way of working with apparatus made throughout of ceramic material. Moreover in comparison with the generally used distilling or concentrating devices of ceramic or silica materials there is the advantage of a considerable better thermic effect.

In the drawings are shown structures which illustrate the utilization of metal for the heat transfer portions of distilling or concentrating apparatus for solutions containing active oxygen.

Figure 2 is a diagrammatic vertical section of a further adaptation.

Figure 1:
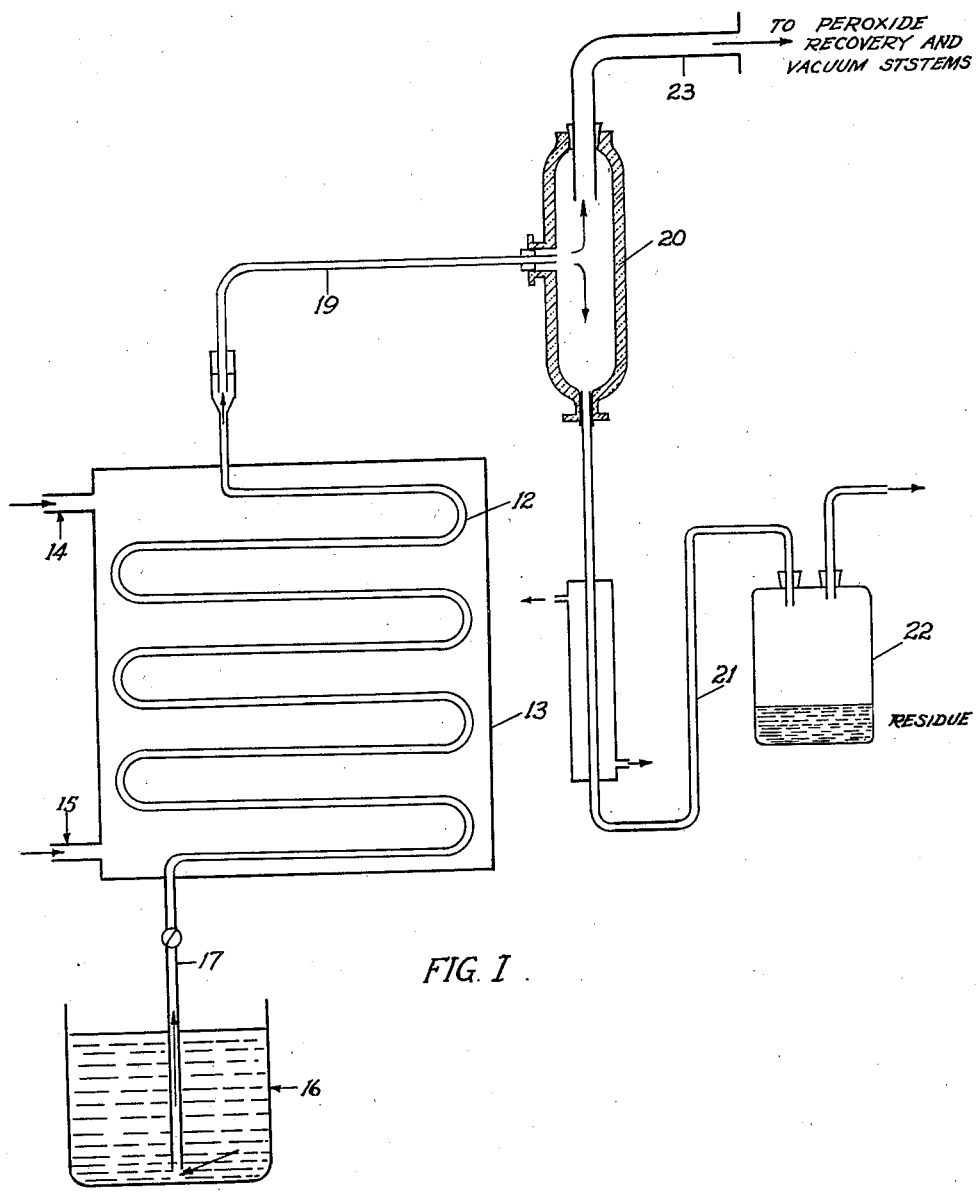
Figure 1 is a diagrammatic vertical section of a further adaptation of my invention.

Figure 1 shows a thin film evaporator constructed in accordance with my discovery. A metallic tube 12 of acid resistant metal passes thru a steam heated container 13 having a steam entrance and exit at 14 and 15. The liquid to be evaporated or condensed is drawn from container 16 by way of tube 17 into the metallic tube 12. Vessel 16, tube 17, and the separator 20 are made of ceramic (glass or similar) material. The liquid and bubbles of vapor leave the metallic distilling tube by way of 19. In separator 20 the hydrogen peroxide vapors are separated from entrained liquid. The separated liquid flows through the cooled U tube 21 into the residue container 22 which is connected to a vacuum pump, not shown. The vapors separated from the liquid are removed by way of bent tube 23 which is connected with a condenser, not shown, and the latter with a vacuum pump, likewise not shown.

The liquid in tube 12 travels upward as a thin layer along the inner wall. This layer, if the distillation rate of hydrogen peroxide is sufficiently rapid (i. e. the heat input sufficient), will leave in contact with the heated tube wall a thin film of concentrated sulfuric acid or concentrated sulfate solution with respect to which the metallic tube is indifferent. The hydrogen peroxide vapor rushes along through the middle of the cylinder of liquid at such rate that appreciable diffusion of $H_2O_2$ into the rising outer liquid layer next to the inner tube wall does not take place. The distillation mixture, liquid and gas bubbles, leaves the metal distilling tube 12 at the exit in the form of a spray.

The yield of active oxygen, if for example one liter of solution contains 180 grams $H_2S_2O_8$, will be about 95%, the remainder will be found in the liquid acid residue. Decomposition practically does not occur. It is possible to so regulate the rate of feed to the distilling tube that there is secured a residual acid or mother liquor containing practically no active oxygen at all.

Figure 2 illustrates another method of using a thin film evaporator. The liquid to be distilled or concentrated is introduced from container 24 into the metal U tube 25, 26 in a constant stream. The U tube is arranged approximately vertical. From the upwardly directed part 26 of the tube the distillation mixture (liquid and vapor) enters the separator 27 from which the liquid is conducted into the residue container 29 by way of cooler 28. Vessel 24, separator 27, and the condenser to which the vacuum pump is attached are made of ceramic material.

It will be understood that by persulfate I refer in general to solutions of persulfuric acid or salts of persulfuric acid.

What I claim is:

1. Process for making hydrogen peroxide by distillation of persulfate solution comprising drawing said solution in a continuous film over and completely covering a heated surface of a metal which, although decomposing persulfate solution and hydrogen peroxide and being attackable by said solution and hydrogen peroxide, is resistant to the residual distillation liquor, while drawing the vapors of hydrogen peroxide liberated therefrom in the same direction as the flow of solution at such velocity as to maintain the film at all times in said continuous condition.

2. Process for making hydrogen peroxide by distillation of persulfate solution comprising drawing said solution in a continuous film over and completely covering a heated surface of lead while simultaneously conducting vapors of hydrogen peroxide liberated therefrom in the same direction as the flow of said solution and at such velocity as to maintain the film at all times in said continuous condition and prevent diffusion of hydrogen peroxide vapors thereinto, and separating hydrogen peroxide vapors from the solution at the end of their flow in contact only with material inert to the vapors.

3. Process for making hydrogen peroxide by distillation of persulfate solution comprising drawing said solution in a continuous film over and completely covering a heated surface of lead while simultaneously conducting vapors of hydrogen peroxide liberated therefrom in the same direction as the flow of said solution and at such velocity as to maintain the film at all times in said continuous condition and prevent diffusion of hydrogen peroxide vapors thereinto, separating hydrogen peroxide vapors from the solution at the end of their flow and condensing the separated vapors in contact only with material inert to the vapors.

4. Process for making hydrogen peroxide by distillation of persulfate solution comprising drawing said solution in a continuous film over and completely covering a heated surface of lead while simultaneously conducting vapors of hydrogen peroxide liberated therefrom in the same direction as the flow of said solution and at such velocity as to maintain the film at all times in said continuous condition and prevent diffusion of hydrogen peroxide vapors thereinto, separating hydrogen peroxide vapors from the solution at the end of their flow and condensing the separated vapors in contact only with material inert to the vapors, said distillation being conducted at sub-atmospheric pressure.

5. Process for making hydrogen peroxide by distillation of persulfate solution comprising drawing said solution in a continuous film through and completely covering the inner surfaces of long narrow heated tubes of lead while simultaneously conducting vapors of hydrogen peroxide liberated therefrom in the same direction as the flow of said solution and at such velocity as to maintain the film at all times in said continuous condition and prevent diffusion of hydrogen peroxide vapors thereinto, separating hydrogen peroxide vapors from the solution at the end of their flow and condensing the separated vapors in contact only with material inert to the vapors.

6. Process for making hydrogen peroxide by distillation of persulfate solution comprising drawing said solution in a continuous film and at sub-atmospheric pressure through and completely covering the inner surfaces of long narrow heated tubes of lead while simultaneously conducting vapors of hydrogen peroxide liberated therefrom in the same direction as the flow of said solutions and at such velocity as to maintain the film at all times in said continuous condition and prevent diffusion of hydrogen peroxide vapors thereinto, separating hydrogen peroxide vapors from the solution at the end of their flow and condensing the separated vapors in contact only with material inert to the vapors.

Signed at Vienna, Austria, June 25, 1928.

GUSTAV BAUM.